Oct. 3, 1944. H. R. ELLINWOOD Re. 22,552

INVERTED GUIDE VALVE UNIT

Original Filed Feb. 18, 1941 2 Sheets-Sheet 1

Inventor
Herman Ray Ellinwood

By R. S. Bean

Attorney

Oct. 3, 1944. H. R. ELLINWOOD Re. 22,552

INVERTED GUIDE VALVE UNIT

Original Filed Feb. 18, 1941 2 Sheets-Sheet 2

Inventor
Herman Ray Ellinwood

By R. S. Bird
Attorney

Reissued Oct. 3, 1944 Re. 22,552

UNITED STATES PATENT OFFICE 22,552

INVERTED GUIDE VALVE UNIT

Herman Ray Ellinwood, Burbank, Calif., assignor to Adel Precision Products Corp., Burbank, Calif., a corporation of California Original No. 2,338,101, dated January 4, 1944, Serial No. 379,453, February 18, 1941. Application for reissue August 7, 1944, Serial No. 548,483

6 Claims. (Cl. 251—132)

This invention relates to valves as used for controlling the hydraulic actuators or boosters for certain controls, the landing gear and other components of an airplane.

Valves of this type are of necessity made as light and as small as possible commensurate with accuracy and reliability of performance and capability of operation under high pressures. Due to these requirements an accurate machining, fitting and assembling of the necessarily small parts of the valve and associated body are rendered difficult and costly as to labor and tooling and the maintenance of such valves also involves high costs. In fact a certain appreciable efficiency loss is accounted for in consideration of the essential low weight and small size factors embodied in such valves.

In consideration of the difficulties and objections, hereinbefore noted it is an object of the present invention to provide a small compact, light weight and highly efficient poppet valve assembly in which all parts requiring accurate fitting are embodied in one unitary sub-assembly capable of being readily inserted for use in and likewise removed from its valve body which latter like the valve assembly may be made of simple form and at a comparatively low cost with a minimum of difficult and costly machining, all by reason of the particular construction and arrangement of said preassembled valve unit.

Another object of my invention is to provide a valve assembly such as described in which a novel inverted guide means eliminates the drilling of holes for the passage of fluid and makes possible the use of an extremely small valve stem which requires no guiding and permits of an unrestricted flow of fluid through the valve seat and associated passages.

Another object of my invention is to provide a valve assembly such as described wherein the desired concentricity of the valve parts requires little special machining consideration inasmuch as concentricity is dependent only on plain ground cylindrical surfaces of parts of the valve assembly and does not require the use of screw threads locks or similar devices as employed in the more or less conventional valve heretofore used in this art.

A further object of my invention is to provide a valve assembly of the character described wherein it is unnecessary to permanently press or screw the assembly into its valve body inasmuch as all sealing requirements are met by the insertion of a simple sealing ring or rings between the guide sleeve and the body, said sealing means performing the dual function of sealing the guide sleeve and body, and sealing the cap or plug employed for removably maintaining the valve assembly in place in said body.

Still another object is to provide a new and useful valve construction which not only facilitates the manufacturing thereof with attendant reduction in costs but also affords a ready replacement of scored or otherwise mutilated components thereof without requiring expensive service tools and costly labor.

A further object of this invention is to provide a valve arrangement such as described wherein the use of an auxiliary intermediate actuating pin or push rod between the short valve stem and the cam shaft removes all possibility of side-load with attendant possible distortion and leakage which often occurs in valves having stems directly actuated by the cam shaft.

Still another object of my invention is to provide a valve assembly of the character described wherein a cylindrical valve sleeve or cage is open at its upper end and has annular seats for itself and the valve at its lower end, said cage having side ports above the seats and being constructed to define an annular passage or chamber between it and the body in which latter it is installed by merely being inserted in a simple bore in said body; the valve proper being mounted in said cage and guided therein solely by a cylindrical guide integral with the valve and having a working fit with the interior of the cage, said guide receiving the valve spring and having side ports registering with the side ports in said cage above the valve proper, the stem of the valve being of relatively small diameter and short to insure unrestricted flow through the valve assembly and said stem serving only as a valve operating means and its sole contact being with a cam shaft actuated push rod.

With the foregoing objects in view together with such other objects and advantages as may subsequently appear, the invention is carried into effect as illustrated by way of example in the accompanying drawings in which.

Figure 1:
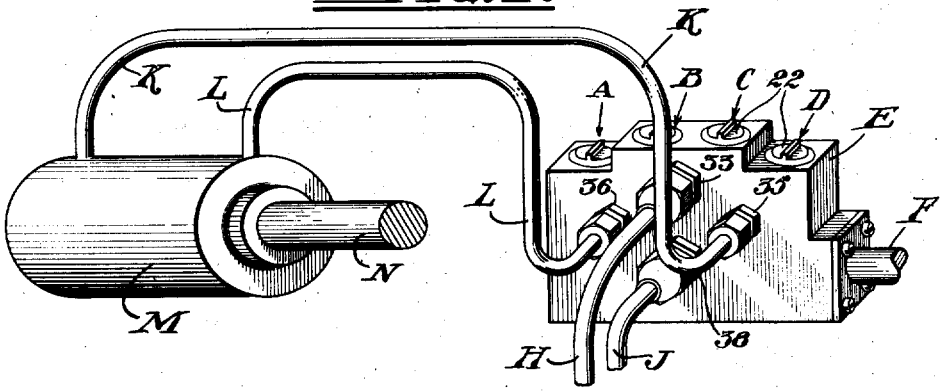
Fig. 1 is a fragmentary perspective view of a multiple valve arrangement embodying the present invention as employed for controlling a hydraulic jack as used in an airplane.

Referring more specifically to the accompanying drawings it will be observed that I have shown four sub-assembly valve units embodying my invention designated A, B, C and D, mounted in line or in a row in a valve body E and adapted to be selectively operated by means of a cam shaft F and push rods G. Pipe lines H and J lead to the body E from a hydraulic pump not shown whereas pipe lines K and L connect this multiple valve unit with opposite ends of the cylinder M of a hydraulic jack such as used for operating or boosting the operation of airplane controls and the like. The jack plunger N is extended and retracted upon appropriate manipulation of the cam shaft and the resultant operation of the control valves hereof as will be hereinafter more fully described.

In carrying out the invention the valve body E is formed from a solid block of metal which is drilled to provide requisite bores, ports and passages hereinafter set forth and including a cylindrical bore 10 leading inwardly from one face of the block and a reduced bore 10′ extending in continuation of the inner end of the bore 10 in axial alignment therewith; an abrupt annular seat or shoulder 9 being formed at the juncture of the inner end of the bore 10 with the outer end of the bore 10′ the face of which shoulder extends perpendicular to the axes of the bores. The outer end portion of the bore 10 is threaded to receive a screw plug 22 between which and the shoulder 12 my sub-assembly valve unit is mounted. Passages for fluid controlled by the valve unit lead from the bores 10 and 10′ as will be later described, which, in the case of the passages leading from the bore 10 constitute a passage which opens to the bores through the cylindrical walls thereof at points intermediate the shoulder 12 and the threaded outer ends of the bores for purposes hereinafter made apparent.

Each of my sub-assembly valve units here shown comprises a cage or sleeve member 6 of cylindrical form fully open at its upper end and provided at its lower end with an integral annular seat member 7. The lower face of member 7 is frusto-conical to provide a beveled seat 8 adapted to engage and rest on the margin of the annular seat or shoulder 9 in the bore 10 of the valve body E with the tip of the member 7 extending slightly into the bore 10′. The upper face of the member 7 is provided around opening 11 therein with an annular upstanding rim-like valve seat 12 spaced inwardly from the inner periphery of the cage side wall.

Between its ends the cage or sleeve 6 is circumferentially relieved or grooved as at 13 so as to define an annular fluid passage 14 between the cage and the cylindrical wall of the bore 10, said passage being in communication with the interior of the cage through side ports 15 in the cage near the plane of the upper side of the seat member 7.

A valve member 16 is mounted in the cage 6 for co-operation with its seat 12 and supports an upstanding hollow guide cylinder 17 which is preferably joined thereto as by means of an annulus or reduced neck 18 of approximately the same over all diameter as the valve 16, the guide proper, that is the portion thereof above said neck 18 being of greater outside diameter than the valve and having a working fit with the bore of the cage or sleeve 6 above the valve member 16. The reduced neck 18 defines an annular balancing or equalizing chamber or passage 19 between the neck and the cage and between the opposed portions of member 7 and the lower end of the guide proper. Ports 20 in the neck 18 afford communication of the interior of the guide cylinder 17 at a point immediately above the valve member 16 with the annual passage 19 and side ports 15 at all times for balancing or equalizing pressures and relieving vacuum.

Figure 4:
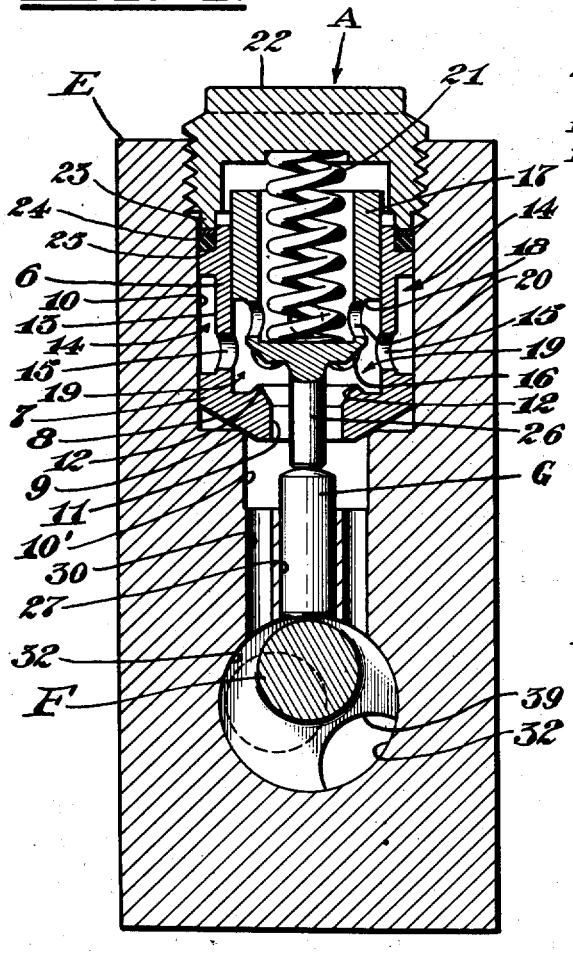
Fig. 4 is an enlarged section on line 4—4 of Fig. 2.
Figure 5:
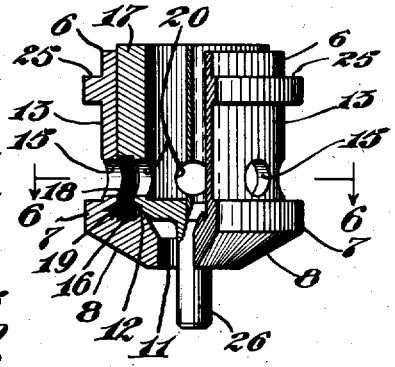
Fig. 5 is a fragmentary elevational sectional view of the valve assembly.
Figure 6:
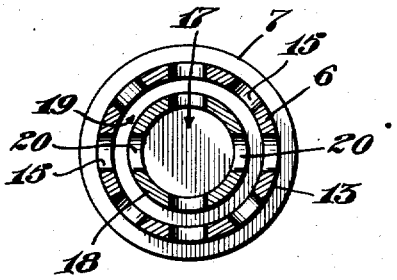
Fig. 6 is a cross section taken on the line 6—6 of Fig. 5.
Figure 7:
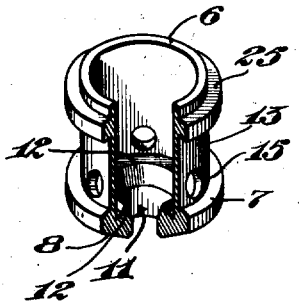
Fig. 7 is a fragmentary perspective view of the valve cage and seat member.
Figure 8:
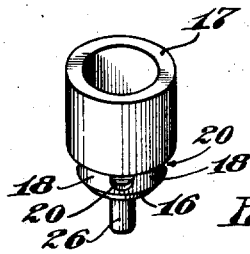
Fig. 8 is a perspective view of the valve and inverted guide member.

A spring 21 is mounted in the guide cylinder 17 bears on the valve member 16 below the ports 20 and abuts the cap-plug 22 threadedly engaged in and closing the outer end of the bore 10, which spring normally holds the valve member 16 seated. When the valve member 16 is seated the ports 20 in the neck 18 will be disposed substantially on a plane with the ports 15 in the cage 6 so that fluid may then flow from the passage 14 directly across the passage 19 and through the ports 15 to the interior of the neck 18 and the tubular guide cylinder 17 and above the valve member 16, and when the valve member 16 is in an open position, as shown in Fig. 4; the fluid will flow from the passage 14 through the ports 15 and pass diagonally downward through the discharge opening 11. The valve member 16 has its outer margin beveled and when open such margin will extend opposite the ports 15 and will then act to deflect the flow of fluid downward beneath the valve. The plug 22 has an annular inner end 23 which bears on a sealing ring 24 of suitable material, mounted in a circumferential recess 25 in the upper end of the cage or sleeve 6 and engaging the wall of bore 10 whereby the plug and ring perform the double function of removably holding the valve assembly in the desired position in the bore 10 and sealing said assembly and the plug in the bore in a most effective manner.

A short valve stem 26 of comparatively small diameter depends from the center of the valve 16 and extends through the opening 11 to a point slightly below the lower side of the member 7 into the reduced bore 10′.

A push rod G is slidable in a bore 27 therefore formed in the valve body and axially aligned with the bores 10 and 10′, which push rod extends into the bore 10′ so that its upper ends contact the valve stem for opening and closing the valve in response to operation of the cam shaft with which latter the lower end of said push rod is engaged.

Figure 2:
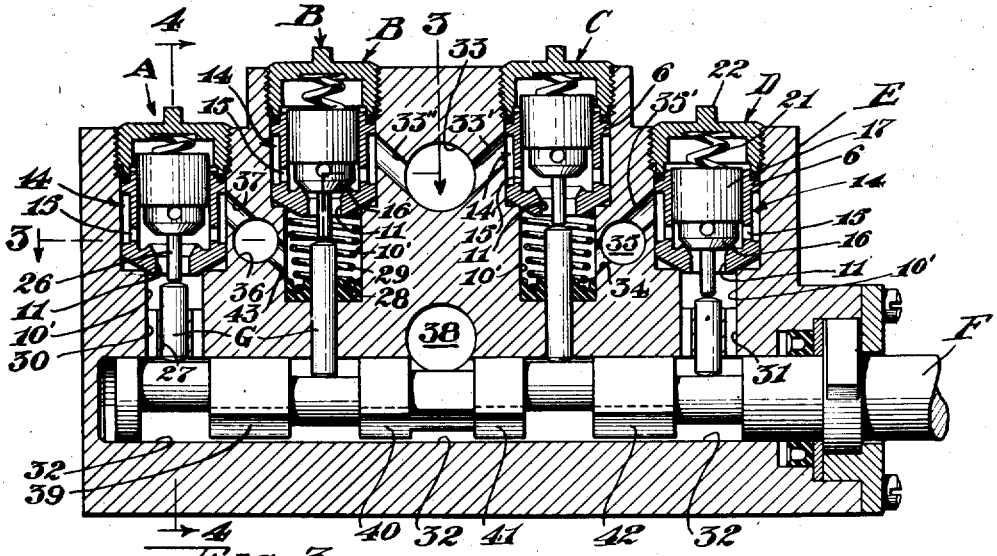
Fig. 2 is an enlarged longitudinal vertical section of the valve shown in Fig. 1 taken on the medial plane thereof.
Figure 3:
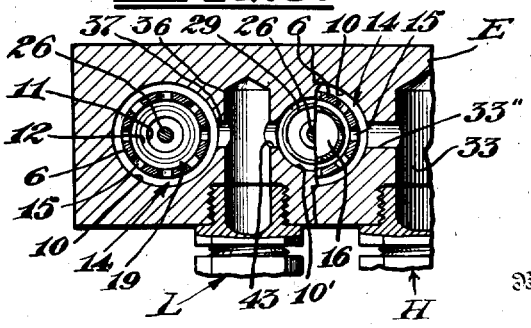
Fig. 3 is a fragmentary cross sectional view taken on the plane of line 3—3 of Fig. 2.

A compressible packing ring 28 surrounds the push rod and is maintained in sealing relation thereto by means of a spring 29 interposed between it and the lower end of the member 7 on the cage sleeve 6, this seal being omitted in certain installations as for example in the valves A and D as shown in Fig. 2 where the lower ends of the bores 10′ have ports 30 and 31 opening into the cam shaft chamber 32 in the body E.

As the valve stem 26 is comparatively small the fluid will have an unrestricted flow through the opening 11 responsive to opening of the valve 16 and associated passages, this free flow being further assured by reason of the construction of the valve cage and valve guide which form the annular passages 14 and 19. This elimination of flow restriction is highly desirable as it makes for quicker response of the hydraulic jack following operation of the valve for controlling it.

It is important to note that the valve assembly of my invention including primarily the cage 6, valve 16, and guide 17 may be conveniently assembled before being installed and in assembled form readily inserted into the bore 15 therefore to become automatically properly centered and maintained in concentricity solely by means of the co-acting cylindrical surfaces of the bore and associated components of the assembly. The plug 22 and ring 24 provide a simple means of removably retaining the valve in place and properly sealing the assembly in the body E.

It will now be apparent that the sub-assembly valve hereof will provide for the advantages and objects hereinbefore pointed out in a particularly efficacious manner by reason of the construction and relative arrangements of the compenents thereof and associated body parts as shown in the accompanying drawings and set forth in the foregoing description.

Referring now more particularly to the multiple valve arrangement shown in Figs. 1 and 2, and assuming the valves A, B, C and D thereof are in the positions as shown in Fig. 2, valves A and C are opened and valves B and D are closed and the unit is set to apply pressure fluid to extend the jack plunger. At this time pressure fluid from the pump not shown is effective through the line H, a passage 33, branch passage 33', annular passage 14 of valve C, ports 15, interior of cage 6, opening 11 of open valve C, bore 10', ports 34, passage 35, line K to one end of the cylinder of the hydraulic jack. The return of fluid from the other end of the jack cylinder M to the pump is effective through line L, passages 36 and 37, annular passage 14 of valve assembly A, ports 15 of valve A, opening 11, bore 10', ports 30, cam shaft chamber 32, passage 38 communicating with chamber 32 and back to the pump through line J leading from passage 38. In this connection it should be noted that the cam shaft is longitudinally grooved at 39, 40, 41 and 42 to afford passageway for fluid in chamber 32 from the valves A and D to the passage 38 which communicates with said chamber.

To retract the jack the cam shaft is turned to open the valves B and D and close valves A and C whereby the pressure fluid is effective through passage 33, branch 33'', annular passage 14, ports 15, oven valve member 16, opening 11 and bore 10' of valve B, ports 43, passage 36, line L to one end of jack cylinder, while the fluid returns from the other end of said cylinder through line K, passage 35, ports 35', annular passage 14, ports 15, open valve member 16, opening 11 and ports 31 of valve D, cam shaft chamber 32, passage 38, and line J to the pump.

While I have shown and described a specific embodiment of my invention I do not limit myself to the exact details of construction set forth, and the invention embraces such changes, modifications, and equivalents of the parts and their formation and arrangement as come within the purview of the appended claims.

I claim:

1. In a valve assembly, a block valve body having a pair of connecting axially aligned cylindrical bores of different diameters provided between their adjacent ends with a seat and formed with ports leading from said bores at points on opposite sides of the plane of said seat, a cylindrical tubular cage adapted to be axially inserted into and withdrawn from the outermost of said bores, a seat member carried on the inner end of said cage and having a frusto-conical outer face for contact with the margin of the seat between said bores and provided on its inner face with a valve seat, a valve member movable axially in said cage into and out of contact with said valve seat, a cylindrical guide carried by said valve member on one side thereof and having a guiding fit within said cage, a plug holding the cage seated, a spring interposed between said plug and bearing directly on said valve member for seating the latter, a stem carried by said valve on the other side thereof and extending through and being circumferentially spaced from said valve seat to afford the passage of fluid through the seat, means extending into the innermost of said bores and engageable with said stem for operating said valve member, and a port in said cage for establishing communication between the ports in said bores when the valve member is unseated.

2. The structure called for in claim 1 in which the cylindrical guide is tubular and open at its outer end and in which one end portion of the spring extends into the bore of the tubular guide and bears directly upon said valve member.

3. The structure called for in claim 1 in which the cllindrical cage is formed with an external circumferential channel between its ends defining a chamber in the outermost of said bores with which the ports in said bore and cage communicate.

4. In a valve assembly, a block valve body having a pair of connecting aligned cylindrical bores of different diameters provided between their adjacent ends with a seat and formed with ports at points on opposite sides of the plane of said seat, a tubular cage adapted to be axially inserted into and withdrawn from the outermost of said bores, a seat member carried on one end of said cage and having on its outer face a seat for contact with the seat between said bores and provided on its inner face with a valve seat, a valve member movable axially in said cage into and out of contact with said valve seat, a guide carried by said valve member on one side thereof, and having a guiding fit within said cage and open at its outer end, a plug holding the cage seated, a spring interposed between said plug and said valve member for seating the latter, a stem carried by said valve on the side thereof opposite said guide and extending through and being circumferentially spaced from said valve seat to afford the passage of fluid through the seat, means extending into said bore and engageable with said stem for operating said valve member, ports in said cage for establishing communication between the ports in said bores when the valve member is unseated, said guide being tubular and open at its outer end to receive the spring and closed at its other end by the valve member, and said spring bearing directly on said valve member within said guide.

5. The structure called for in claim 4 in which the tubular guide is formed with ports in the side wall thereof immediately above the seating point of said spring on said valve member affording communication between the interior of said guide and the ports in the cage.

6. The structure called for in claim 4 in which an annular neck connects the guide and the valve member of smaller diameter than said guide member; said neck surrounding the end portion of said spring seating on said valve and defining a chamber between the cage and neck in communication with the ports in the cage, and said neck having ports affording an open communication between the interior of the guide and neck and said chamber.

HERMAN RAY ELLINWOOD.